(No Model.)
F. TRIER.
MACHINERY FOR WORKING STONE, &c.
No. 558,439. Patented Apr. 14, 1896.
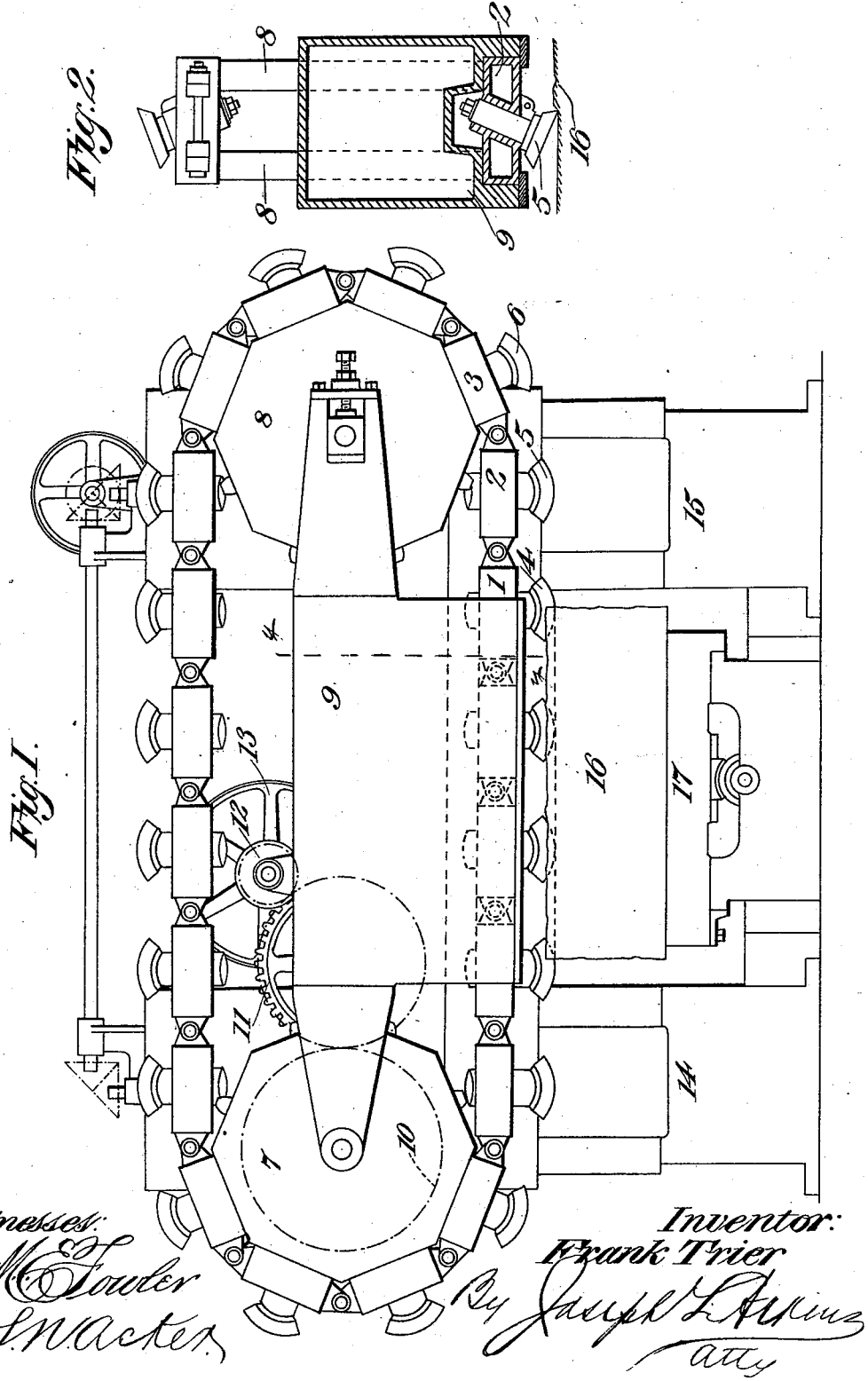
Witnesses:
M. Fowler
L. N. Acker
Inventor:
Frank Trier
By Joseph L. Atkins
Atty

UNITED STATES PATENT OFFICE.

FRANK TRIER, OF LONDON, ENGLAND.

MACHINERY FOR WORKING STONE, &c.

SPECIFICATION forming part of Letters Patent No. 558,439, dated April 14, 1896.

Application filed September 13, 1895. Serial No. 562,420. (No model.)

*To all whom it may concern:*

Be it known that I, FRANK TRIER, a subject of the Queen of Great Britain, residing in Westminster, London, England, have invented certain new and useful Improvements in Machinery for Working Stone and the Like with Circular Rolling Cutters, of which the following is a specification, reference being had to the accompanying drawings.

Rolling cutters have hitherto been used in stone-dressing machines either mounted on reciprocatory tool-holders or on revolving chucks; but both methods have disadvantages, the former being slow, the latter producing circular instead of straight tool-marks.

In my invention I carry the spindles of the rolling cutters in links forming an endless chain driven by suitable gearing. This method of applying the rolling cutters combines the advantage of the reciprocating cutter in producing straight tool-marks with the advantages of the revolving chuck in having a continuous motion and permitting the employment of a considerable number of cutters to accelerate the work.

Figure 1 of the accompanying drawings shows in a front view one type of a stone-working machine in which the chain carrying the cutters is arranged to dress horizontally. Fig. 2 is a transverse section on line *y y*, Fig. 1.

Referring to the figures on the drawings, 1 2 3, &c., are the links of the chain carrying the cutters 4 5 6, &c. The chain passes around the double sprocket-wheels 7 and 8, the teeth of which engage with the links. The sprocket-wheels are carried in the cross-girder 9, which contains the slide in which the links of the cutters are guided while passing over the stone. The chain is driven by means of the gearing 10 11 12 and the pulley 13. The cross-girder can be raised or lowered in the usual way on the standards 14 and 15.

The stone 16 is fixed to the table 17, which is moved by suitable gearing and travels at right angles to the travel of the cutters.

Fig. 2 shows the cross-girder and its slide containing one of the links in section.

I do not limit myself to the type of machine shown in the drawings, but use machines in which the cutter-chain is made to work vertically or at any required angle, or I combine two or more chains in one machine. I also arrange the cutters relatively to each other in a variety of ways according to the nature of the stone and the class of work, and I use the cutter-chain to work moldings and curved surfaces. I sometimes cause the cutters to touch against a suitable surface, so that friction therewith gives them a rotation before touching the stone.

What I claim is—

1. In machinery for working stone, the combination with a chain, of a rotary cutter carried upon a link of the chain, substantially as specified.

2. In machinery for dressing stone, the combination with an endless chain, of a plurality of rotary cutters carried by links of the chain, substantially as specified.

FRANK TRIER.

Witnesses:
T. U. BAMFORD,
R. E. SUMMERFORD.